F. F. PARADIS.
SIGNAL FOR MOTOR VEHICLES.
APPLICATION FILED DEC. 1, 1917.
1,273,657.
Patented July 23, 1918.
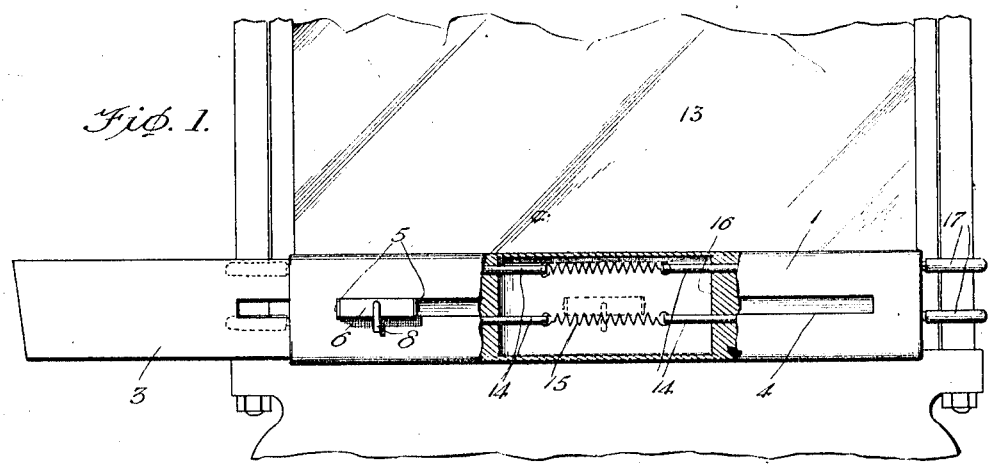
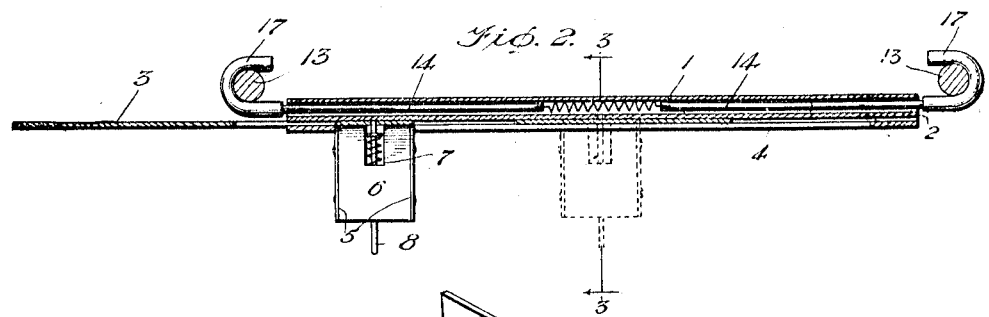
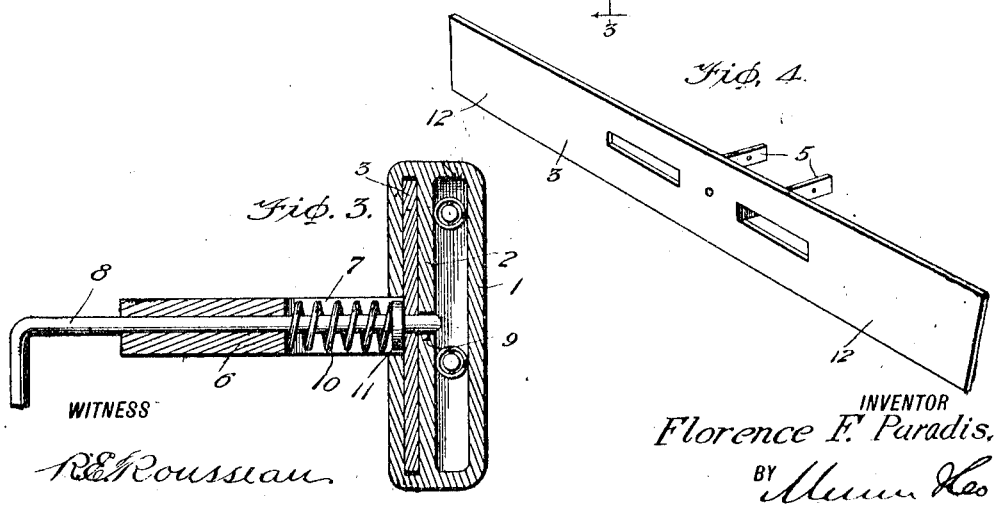
WITNESS
R. E. Rousseau
INVENTOR
Florence F. Paradis.
BY
ATTORNEYS

UNITED STATES PATENT OFFICE.

FLORENCE FERN PARADIS, OF IDAHO SPRINGS, COLORADO.

SIGNAL FOR MOTOR-VEHICLES.

1,273,657.   Specification of Letters Patent.   Patented July 23, 1918.

Application filed December 1, 1917. Serial No. 204,848.

*To all whom it may concern:*

Be it known that I, FLORENCE FERN PARADIS, a citizen of the United States, and a resident of Idaho Springs, in the county of Clear Creek and State of Colorado, have invented certain new and useful Improvements in Signals for Motor-Vehicles, of which the following is a specification.

My invention is an improvement in signals for motor vehicles, and has for its object to provide a signal of the character specified, capable of quick and easy attachment to or detachment from a wind shield, and wherein the signal proper is arranged to be extended at either side of the wind shield as may be desired, locking mechanism being provided for holding the signal in either position or in neutral position.

In the drawings:

Figure 1 is a rear view of the wind shield of a motor vehicle carrying the improved signal;

Fig. 2 is a longitudinal section through the signal;

Fig. 3 is a section on the line 3—3 of Fig. 2;

Fig. 4 is a perspective view of the signal plate.

In the present embodiment of the invention, a casing 1 is provided of suitable material, the casing being in the form of a tubular structure and being divided, by a vertical longitudinally extending partition 2, into two chambers. In one of these chambers is mounted a signal plate 3, the said plate fitting the chamber in such manner that it may be moved in either direction, and the plate is slightly longer than the casing.

The front wall of the casing is slotted longitudinally as shown at 4, and the plate 3 has struck up lugs 5 which extend outwardly through the slot, and are connected by a block 6, the lugs 5 being secured to the opposite side edges of the block. These lugs are spaced apart, as shown, a sufficient distance to receive the block, and the block has a recess 7 at its inner end, extending from the said inner end to near the center of the block.

A locking pin 8 is mounted to move in an opening longitudinally of the block and in the notch or recesss 7, the said pin being adapted to engage one of a series of openings 9 in the partition wall 2, to hold the signal plate 3 in adjusted position. The outer end of the pin is bent laterally to form a handle, and a spring 10 is arranged within the notch or recess 7, between the outer end of the recess and a stop 11 on the pin, and the spring acts normally to force the pin inwardly to cause it to engage with one of the openings 9. The opposite ends of the plate bear legends 12, that at one end of the plate being "right" while that at the opposite end is "left", and the openings 9 are so positioned that when the pin is in either of the end openings the legend at that end will be displayed, while when the pin is in the central opening the legends will be hidden. It will be understood that both faces of the plate are provided with legends.

Means is also provided for connecting the signal to the wind shield 13 of a motor vehicle. The said means comprises a pair of rods 14 in each end of the casing and in that chamber which does not carry the plate 3. The corresponding members of each pair of rods are connected by coil springs 15 which tend to draw the rods toward each other, and the rods are slidably mounted in solid portions 16 in the casing. At the outer ends each rod has a hook 17, and these hooks are preferably covered with rubbber, in order that they will not mar the wind shield supporting brackets.

In use, to connect the device to the motor vehicle, the hooks 17 at each end are engaged with the frame of the wind shield, the pairs at each end being drawn outwardly for this purpose. The signaling device is now supported transversely of the wind shield, preferably just above the dashboard, with the handle end of the pin 8 extending inwardly. When the driver indicates a turn to the left, for instance, he will draw the pin toward him to release it from the opening 9 with which it is then engaged, and will move it to the left, as indicated in Figs. 1 and 2. When going straight ahead, the parts occupy the dotted line position of Figs. 1 and 2. It will be noticed that the plate 3 is of such length that when in neutral position it does not extend beyond the edges of the wind shield.

I claim:

1. A device of the character specified, comprising a tubular casing having a central partition extending longitudinally of the casing, a signaling plate mounted to slide on one side of the partition and adapted to extend at either end of the casing, means for moving the plate, means for locking the plate with either end extended or in neutral position, means in connection with the casing on the other side of the partition for securing the casing to the wind shield of a motor vehicle, said means comprising pairs of rods mounted to slide in the casing on the said other side of the partition, a pair of rods being arranged at each end of the casing and corresponding members of the pairs being yieldingly connected to permit them to move away from each other, and hooks on the outer ends of the rods, said outer ends being extended beyond the casing and being adapted to engage the wind shield.

2. A device of the character specified, comprising a tubular casing having a central partition extending longitudinally of the casing, a signaling plate mounted to slide on one side of the partition and adapted to extend at either end of the casing, means for moving the plate, means for locking the plate with either end extended or in neutral position, and means in connection with the casing on the other side of the partition for detachably securing the casing to the wind shield of a motor vehicle.

3. A device of the character specified, comprising a tubular casing having means for detachably connecting the same with the wind shield of a motor vehicle transversely of the said shield, a signal plate mounted to slide in the casing and adapted to be extended at either end of the casing, means for moving the plate, and means in connection with the moving means for locking the plate with either end extended or in neutral position, said means comprising a handle connected with the plate, a pin mounted to move in the handle toward and from the plate, said plate having an opening through which the pin extends and the partition having openings for engagement by the pin to hold the plate in adjusted position, and a spring normally pressing the pin toward the partition.

FLORENCE FERN PARADIS.

Witnesses:
JAMES L. WALK,
J. M. KINSINGER.